US012023764B2

(12) United States Patent
Klein

(10) Patent No.: US 12,023,764 B2
(45) Date of Patent: Jul. 2, 2024

(54) OPERATING DEVICE FOR A WELDING POWER SUPPLY

(71) Applicant: SKS WELDING SYSTEMS GMBH, Kaiserslautern (DE)

(72) Inventor: Thomas Klein, Rodenbach (DE)

(73) Assignee: SKS WELDING SYSTEMS GMBH, Kaiserslautern (DE)

( * ) Notice: Subject to any disclaimer, the term of this patent is extended or adjusted under 35 U.S.C. 154(b) by 1046 days.

(21) Appl. No.: 16/649,632

(22) PCT Filed: Sep. 23, 2018

(86) PCT No.: PCT/EP2018/000446
§ 371 (c)(1),
(2) Date: Aug. 29, 2020

(87) PCT Pub. No.: WO2019/057334
PCT Pub. Date: Mar. 28, 2019

(65) Prior Publication Data
US 2023/0191523 A1 Jun. 22, 2023

(30) Foreign Application Priority Data
Sep. 23, 2017 (DE) ...................... 10 2017 009 140.4

(51) Int. Cl.
B23K 9/10 (2006.01)

(52) U.S. Cl.
CPC .................. B23K 9/1062 (2013.01)

(58) Field of Classification Search
CPC ... H01L 23/49575; H01L 24/48; H01L 24/73; H01L 25/16; H01L 2224/48245; H01L 2224/73265; H01L 2924/1033; H01L 2924/1425; H01L 23/49541; H01L 24/06; H01L 24/13; H01L 24/37; H01L 24/49; H01L 2224/04042; H01L 2224/05554; H01L 2224/0616; H01L 2224/13101;
(Continued)

(56) References Cited

U.S. PATENT DOCUMENTS

2014/0222252 A1* 8/2014 Matters ................ G05D 1/0011
701/2
2015/0129581 A1* 5/2015 Cole .................... B23K 9/1087
219/60 A

FOREIGN PATENT DOCUMENTS

EP 1616390 B1 2/2011
EP 3091299 A1 11/2016

* cited by examiner

Primary Examiner — Robert G Bachner
(74) Attorney, Agent, or Firm — TAROLLI, SUNDHEIM, COVELL & TUMMINO L.L.P.

(57) ABSTRACT

An operating device of a welding system is provided with a display means for visually displaying set parameter values of the welding system, and comprises input means by which parameters of the welding system can be changed. An operating device includes a plurality of input means arranged outside the display means, is provided. The input means is designed as soft keys, wherein, each of the soft keys can be assigned parameters of the arc welding method or functions, via operation of the operating device, due to the fact that the display means is designed as a touch-sensitive touchscreen and the respective soft key can be assigned a specific parameter or a specific function by selection from a predefined selection of parameters or functions displayed on the display means and, after selection, the respective parameter can be changed or the function can be applied by actuating the respective soft key.

8 Claims, 6 Drawing Sheets

(58) Field of Classification Search
CPC ....... H01L 2224/1329; H01L 2224/371; H01L 2224/45124; H01L 2224/45139; H01L 2224/45144; H01L 2224/45147; H01L 2224/48091; H01L 2224/4811; H01L 2224/48137; H01L 2224/48145; H01L 2224/48247; H01L 2224/48257; H01L 2224/49052; H01L 2224/49113; H01L 2224/4917; H01L 2224/49171; H01L 2224/49431; H01L 2924/00014; H01L 2924/10253; H01L 2924/12035; H01L 2924/1306; H01L 2924/1426; H01L 2924/181; H01L 23/3677; H01L 23/49562
See application file for complete search history.

OPERATING DEVICE FOR A WELDING POWER SUPPLY

RELATED APPLICATIONS

The present invention is a U.S. National Stage under 35 USC 371 patent application, claiming priority to Serial No. PCT/EP2018000446, filed on 23 Sep. 2018; which claims priority of DE 102017009140.4, filed on 23 Sep. 2017, the entirety of both of which are incorporated herein by reference.

The invention relates to an operating device of a welding current source, having a display means for the visual representation of set parameter values of a welding method, and having input means by means of which parameters of an arc welding system can be changed.

Arc welding systems comprise a welding current source with which an arc welding torch can be provided with the electrical current required to carry out arc welding methods. In addition to current and voltage, other parameters and specifications for the method can also be set for a welding method, including the speed of the wire feed, the gas supply, program sequence parameters and/or characteristic curve parameters, for example. In particular for automated welding methods, pre-settings with regard to parameter values and material values, among other things, must be supplied to the controller by manual inputs for the subsequent process sequence. Later, optimizations are usually carried out manually in a teach-in process by an operator, and the set parameters are stored in a controller of the arc welding system for subsequently automated processing methods. It is also possible for an operator to control a welding method manually, independently of a teach-in process, by means of an operating device.

Operating devices suitable for these processes usually have a display device on which an operator can read the values set and/or specified for different parameters and change them using input means. Various input devices are already known, for example rotary, push or hardware buttons. Likewise, in connection with operating devices, touch-sensitive display devices are also known, which are provided and designed both for display and for input.

These settings on an operating device often have to be made in the harsh environment of industrial production. Operators should therefore also be able to operate an operating device with work gloves, although the tactile sense of the operator and the possibility of manipulating an operating device sensitively are, at the very least, severely restricted. Another requirement placed on operating devices is that they should enable an operator to operate the tasks relevant to her as easily as possible.

The invention is therefore based on the object of providing an operating device of the type mentioned at the outset, with which an operator can perform operations reliably and quickly despite the large number of different parameters to be taken into account.

This object is achieved according to the invention with an operating device of the type mentioned at the outset by providing a plurality of input means of the operating device which are arranged outside of the display means and which are designed as soft keys, wherein, in an assignment mode of the operating device, each of the soft keys can be assigned parameters of the arc welding method or functions, via operation of the operating device, due to the fact that the display means designed as a touch-sensitive touchscreen can be actuated and the respective soft key can be assigned a specific parameter or a specific function by selection from a predefined selection of parameters or functions displayed on the display means and, after selection, in a working mode of the operating device, the respective parameter can be changed or the function can be applied by actuating the respective soft key. In a preferred development of the invention, it can be provided that each of the soft keys can be assigned different or the same parameters or functions in succession in this way. The object is also achieved by a method according to claim 7.

The invention is therefore based on the consideration of providing several physically available buttons (soft keys) as input means on the operating device, which can be assigned different functions or parameters by means of a touchscreen arranged in the immediate vicinity of the physically available buttons (soft keys) for influencing an arc welding method. In this case, the operating device should be able to be put into an assignment mode in which at least one of the physically present input means can be assigned a specific function, namely the possibility of influencing a previously determined parameter of the arc welding method, influencing a menu navigation of the control panel, or influencing another configuration of the welding method or the welding system, for a subsequent working mode of the operating device. In the working mode of the operating device, each set value of the parameter can then be changed by actuating the physically present soft keys (physically embodied input means), which can also be referred to as hardware buttons. The change to the assignment mode is preferably carried out directly from the working mode. With this solution according to the invention, it is thus possible, with a small and therefore clear number of several soft keys designed as hardware buttons, to control a complex arc welding method by manual intervention by means of the hardware buttons and by a far greater number of parameters, functions, inputs than actually provided hardware buttons. It is also possible to perform a machine configuration in this way. An operator can configure the operating device according to his requirements and preferably assign the required parameters to one of several hardware buttons by means of a selection that he can determine. At least one of the hardware buttons, preferably several and particularly preferably all hardware buttons, can thus be successively assigned different functions for controlling the welding process and/or for configuring the welding system and/or the operating device, and these functions can also be removed from the respective hardware button. Insofar as "functions" are mentioned in connection with the invention and with hardware buttons, which can be assigned to the at least one hardware button, "functions" can mean all settings which can be made and with which user intervention can influence a welding method and a welding system, including the configuration of the welding system and the operating device itself. "Functions" can thus include, in a non-exhaustive list, welding parameters, functions of the welding system such as "gas on" and "gas off," plus/minus, increasing and decreasing values, inputs or navigation through the menu of the control device.

According to the invention, the respective function is to be assigned by means of a touch-sensitive touchscreen. The touchscreen and the GUI (graphical user interface) displayed on it, together with its program logic, have the function of displaying the parameters and/or functions available for selection on the touchscreen and offering them for selection. The touchscreen and the GUI displayed on it, together with its program logic, also have the function of making it possible for the operator to select, by manually actuating on the touchscreen, a parameter for a changeable assignment of the selected parameter to a specific hardware button of the plurality of hardware buttons provided on the operating device. In this case, it should preferably be possible to assign the given parameter to any of several hardware buttons, as a result of which the operating device can be configured not only in a method-specific manner but also in a user-specific manner for each arc welding process. This assignment is preferably carried out in an assignment mode of the operating device.

In a preferred embodiment of the invention, the assignment mode can also be switched separately for individual hardware buttons, while other hardware buttons are in the working mode at the same time and, for example, the welding process can be influenced with these other hardware buttons at the same time. The touchscreen and the GUI displayed in each case, together with the program logic, are preferably also assigned the function of being able to switch back and forth between the assignment mode and the working mode. In other embodiments of the invention, however, a separate hardware button could also be provided for this.

In a further preferred embodiment of the invention, in particular for parameters whose values should be adjustable downwards and upwards within a range, that is to say increased or reduced, a plurality of pairs of hardware buttons can be arranged as soft keys on the operating device, preferably in the immediate vicinity of the display device. With each of the hardware button pairs, a hardware button of the pair is thus provided with which the assigned parameter value can be increased, and another hardware button of the pair is provided with which the assigned parameter value can be reduced. As an alternative to hardware button pairs, rocker buttons can also be provided, the actuating of which in one direction increases the parameter value and the actuating of which in the other direction reduces the parameter value. Just like hardware button pairs, rocker buttons generally have two buttons that can be used to enable choosing associated functions, such as increasing a certain parameter value with one button and decreasing the same parameter value with the other button of the rocker button. Further examples of a non-exhaustive list include yes/no decisions for the function "protective gas on" or "protective gas off," or "wire feeder on" or "wire feeder off," which can likewise each be input into the operating device and thus also into the controller with one of the two buttons on a rocker button.

A particularly intuitive operation of the operating device can be achieved in that a switch from the working mode to the assignment mode can be made by touching a specific area of the touchscreen, in particular an area which is located directly next to the respective soft key. In this context, it can also preferably be provided that a selection of parameters of the welding process is automatically displayed on the touchscreen, of which a parameter can be selected for a soft key, in particular for the soft key whose neighboring area of the touchscreen was previously actuated, to subsequently change the value of this parameter using precisely this soft key after reaching the working mode. Upon a further change into the assignment mode, in particular into the assignment mode for the same soft key, a parameter, in particular a different parameter from the previously set parameter, can in turn be assigned to said soft key from the list of parameters.

It can also be preferred that the assignment mode can be set separately for individual soft keys. A particularly simple and intuitively operable option for this can be that individual soft keys are assigned certain areas or zones on the touchscreen by the respective GUI, and when the specific zone of a soft key is touched or actuated on the touchscreen, the assignment mode is activated. It can be particularly favorable in this case, from an ergonomic point of view, if some or preferably all of the physically present soft keys are arranged along the edge and outside of the touchscreen, and at a distance from one another. A respective area of the touchscreen adjacent to the respective soft key, preferably an area adjacent to the edge of the touchscreen, can be assigned to the respective soft key for activating the assignment mode for only this soft key when it is touched or actuated. Preferably, the assignment mode for only this one soft key can be activated separately for each, or at least for a plurality, of the existing soft keys. In other words, in this preferred embodiment of the invention it can be provided that for the individual soft keys, wherein each of their respective assignment modes can be activated one after the other and can only be activated when either no other assignment mode is active or when a new assignment mode is activated, a still-active assignment mode of another soft key is aborted or ended. Likewise, it can preferably be provided that an active assignment mode has to first be actively closed by taking an action on the operating device, for example actuating the touchscreen, before a new assignment mode can be activated.

In a preferred embodiment of the invention, at least one double button or rocker button can be provided for which, if its two buttons are assigned two related but different functions, for example plus/minus functions, when the area of the touchscreen assigned to them is actuated, a separate assignment mode is entered for each of the two buttons of the given double button or the rocker button.

In a further preferred embodiment with which a particularly quick configuration of the operating device is possible, for a double button or a rocker button, in which a separate assignment mode is activated for each of the two buttons of the double button or rocker button, when a function is assigned to one of the two buttons of the double button or rocker button, by means of this single assignment, both buttons of the double or rocker button can automatically switch into the execution mode.

If, as is provided in a preferred embodiment of the invention, the working mode is activated automatically as soon as the assignment mode has ended, this can contribute to a particularly simple, reliable and, at the same time, quick operability. In a favorable development of this embodiment of the invention, the assignment mode can be ended automatically and the execution mode can be activated as soon as a parameter is assigned to the corresponding soft key in the assignment mode. Such an assignment can expediently take place in that the parameter displayed on the touchscreen is selected via touch operation of the touchscreen and is thus activated for the respective soft key. In a further preferred embodiment of the invention, the touchscreen can have a middle and/or central area in which, in the given assignment mode for which the assignment mode is activated, the parameters available for selection for the respective soft key are displayed, preferably provided in the form of a list.

For parameters of the welding process that only allow two values, such as "on" or "off," at least one singular hardware button can be provided as the soft key. If the assignment mode is requested, the touchscreen preferably only offers parameters which only allow two digital values, such as "0" and "1" or "on" and "off" and the like, for selection for this button. An example of such a parameter is, for example, "protective gas supply" on or "protective gas supply" off. In a preferred development of this embodiment, a plurality of singular hardware buttons can also be provided on the operating device, each of which can be assigned a parameter which only allows digital values. In connection with the invention, the soft keys (hardware buttons) can function differently for the working mode in different exemplary embodiments. For example, it is possible to provide one or more soft keys with a program logic which forms them as bi-stable or as monostable switches. Both variants can be edge triggered on the edges of the button signal. This can react to the rising or falling edge. In other words, the soft key can trigger an action either when it is actuated or when it is released.

Further preferred embodiments of the invention result from the claims, the description and the drawing.

The invention is explained in more detail with reference to exemplary embodiments shown purely schematically in the figures, in which.

Figure 1:
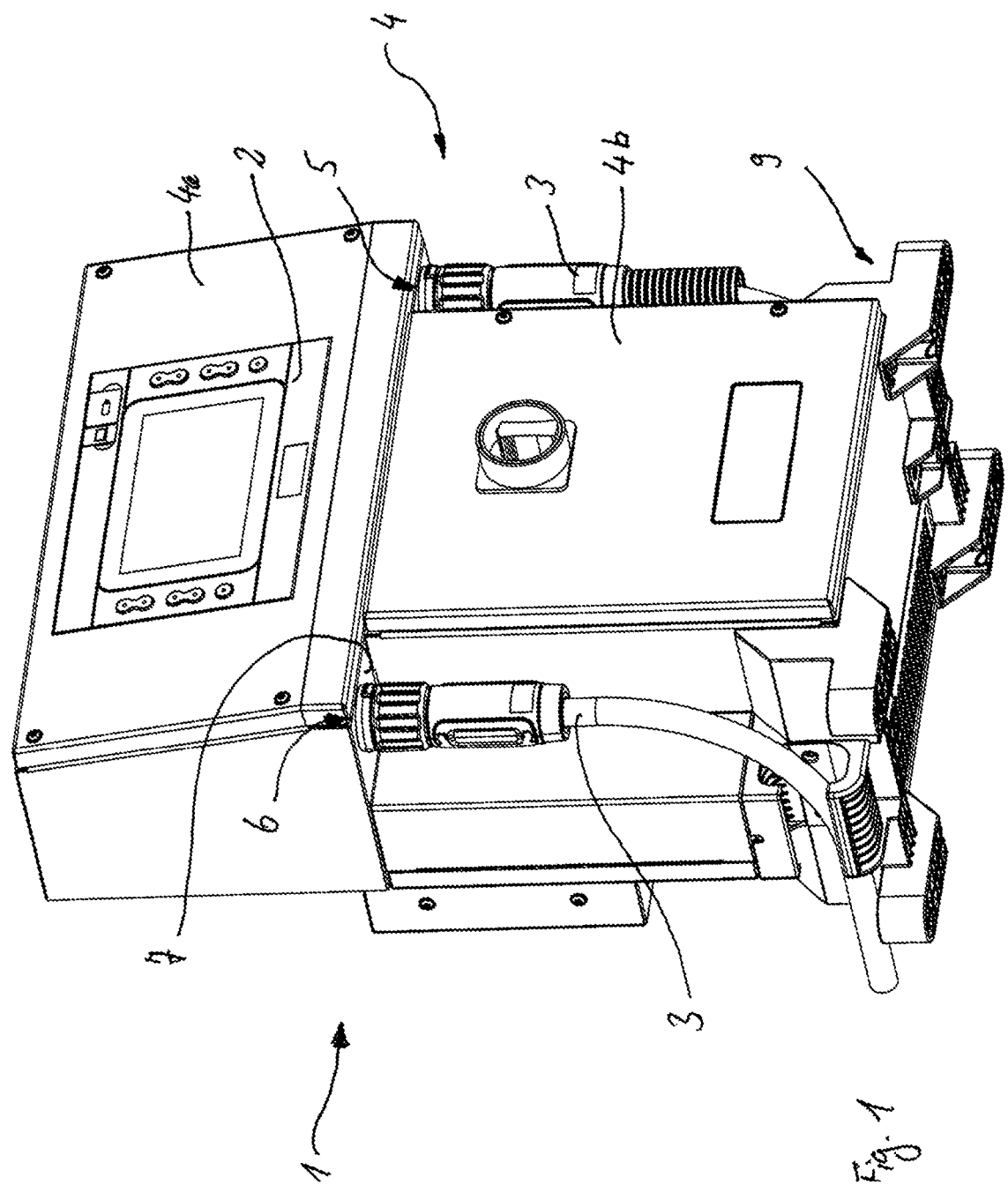
FIG. 1 shows a perspective view of a welding current source having an operating device, with welding current cables connected to its two pole contact devices.

FIG. 1 shows a welding current source 1 with which electrical current and an electrical voltage are provided for performing arc welding methods by means of an arc welding torch (not shown in more detail). In addition, the welding current source 1 contains a control device with an operating panel 2 as an operating device with which parameters of the arc welding process to be carried out in each case can be set and the welding process can be controlled. In the present case, the welding current source 1 can be used, for example, to carry out MIG/MAG or also TIG, plasma, electrode and all other electrical welding processes or high-current applications. In further possible embodiments of the invention, other arc welding and cutting methods can also be carried out with the welding current source. Two pole contact devices 5, 6, which are provided for the connection of one welding current cable 3 each, protrude from a housing 4 of the welding current source 1. As can be seen in FIG. 1, the upper section 4a of the housing 4 projects on both sides of the housing with respect to the narrow front part 130 of the T-shape of the lower housing section 4b. With regard to the rear, wider part 131 of the T-shape of the lower housing section 4b, the upper housing section 4a has a width which corresponds at least approximately to the width of the rear, wider part 131 of the T-shape of the lower housing section 4b. This configuration results on the sides of the housing 4, in each case an area of the upper housing section 4a in which an underside 7 of the projecting part of the upper housing section is covered by a housing cover, here a housing plate, and is freely accessible. These two areas of the underside 7 of the upper housing section 4a are rectangular in the exemplary embodiment and freely accessible from the front and from one side of the housing 4 for access. These two areas of the underside 7 of the upper housing section 4a are separated from one another by the narrow part of the T-shape of the lower housing section. One of the two pole contact devices 5, 6 is arranged on each of the two areas of the underside 7 of the upper housing section 4a, so that only one of the pole contact devices 5, 6 is located on each of these two areas. The two pole contact devices 5, 6 thus protrude on the underside 7 of the upper housing section 4a from the housing 4 of the preferred welding current source 1 according to the invention. The housing 4 of the welding current source is arranged on a two-part stand element 9, with which the housing can be set up on a surface.

Figure 2:
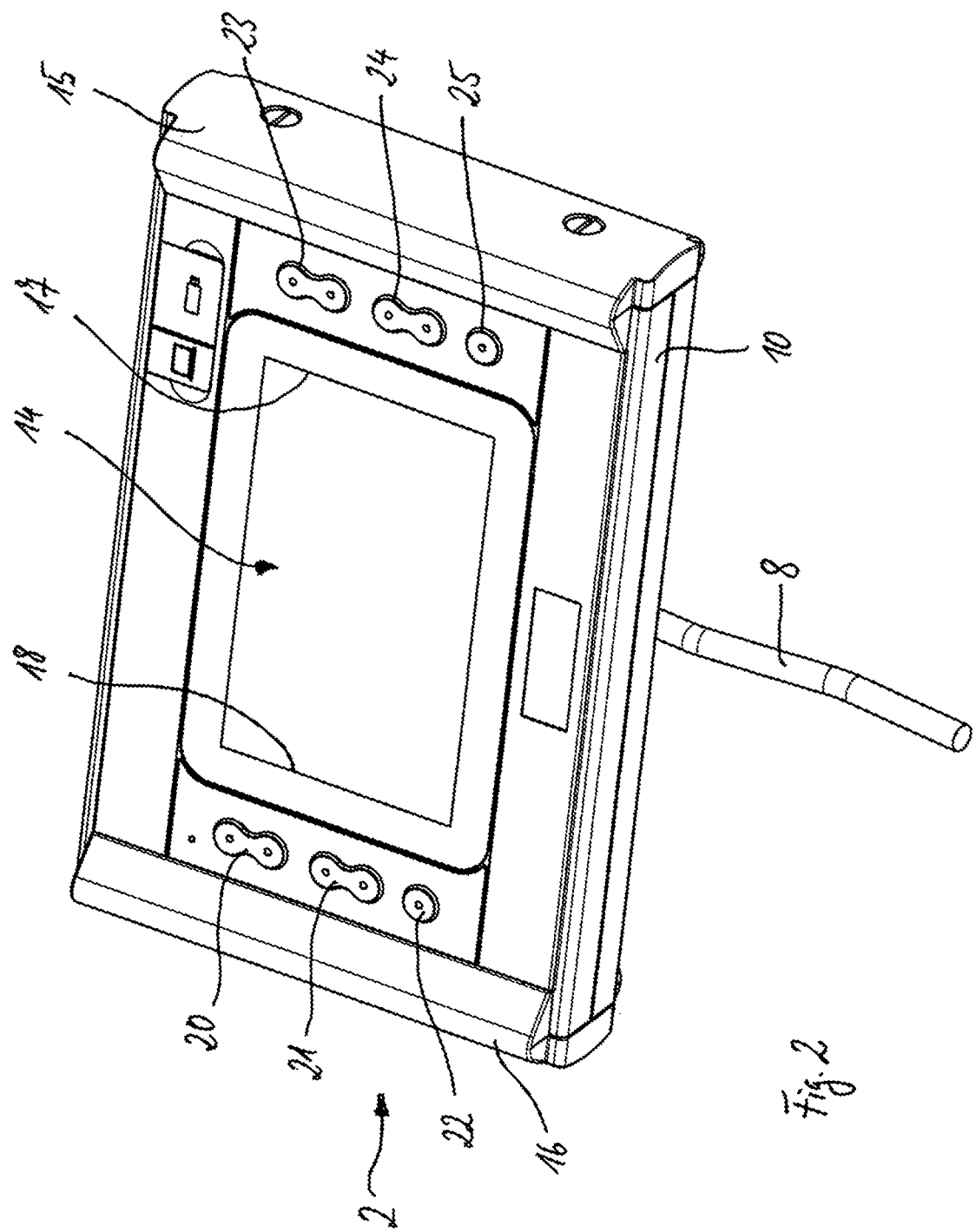
FIG. 2 shows an operating device which can be connected to a welding current source by means of a cable.

In the illustration in FIG. 1, the control panel 2 is permanently integrated into the housing on the front side of the housing. On the other hand, the illustration in FIG. 2 shows an alternative embodiment for the welding current source, which is basically the same, in which an operating panel 2 provided with an electrical cable 8 and not fixedly attached to the housing is shown. By means of the cable 8 leading into the housing 4 and connected there to the control electronics, data can be exchanged between the control panel 2 and the control electronics (not shown in more detail). The two control panels 2 from the two embodiments are otherwise identical, can be operated in an identical manner and offer the same range of functions.

The control panel 2 shown in FIG. 2 has a housing 10, into which an approximately rectangular touch-sensitive touchscreen 14 is inserted, which has the function of a display device. The housing is provided with two handle strips 15, 16, which are designed according to ergonomic considerations, so that an operator can hold the control panel 2 in a simplified manner. Immediately in the region of its two side edges 17, 18, six hardware buttons 20, 21, 22; 23, 24, 25 are arranged outside of the touchscreen 14 but adjacent to the touchscreen 14. The two upper hardware buttons 20, 21 and 23, 24 are each designed as a pair of buttons that can be operated separately from one another. When one button of the respective button pair is actuated, parameter values are increased; when the other button of the respective button pair is actuated, however, parameter values are decreased. The increase and/or decrease can take place with each actuation by a certain interval step. With the lowest button 22, 25 on each side of the touchscreen, however, functions or properties of the welding power system can be switched on or off. When the respective buttons 22, 25 are actuated, these are switched on, and when they are actuated again, they are switched off.

Figure 3:
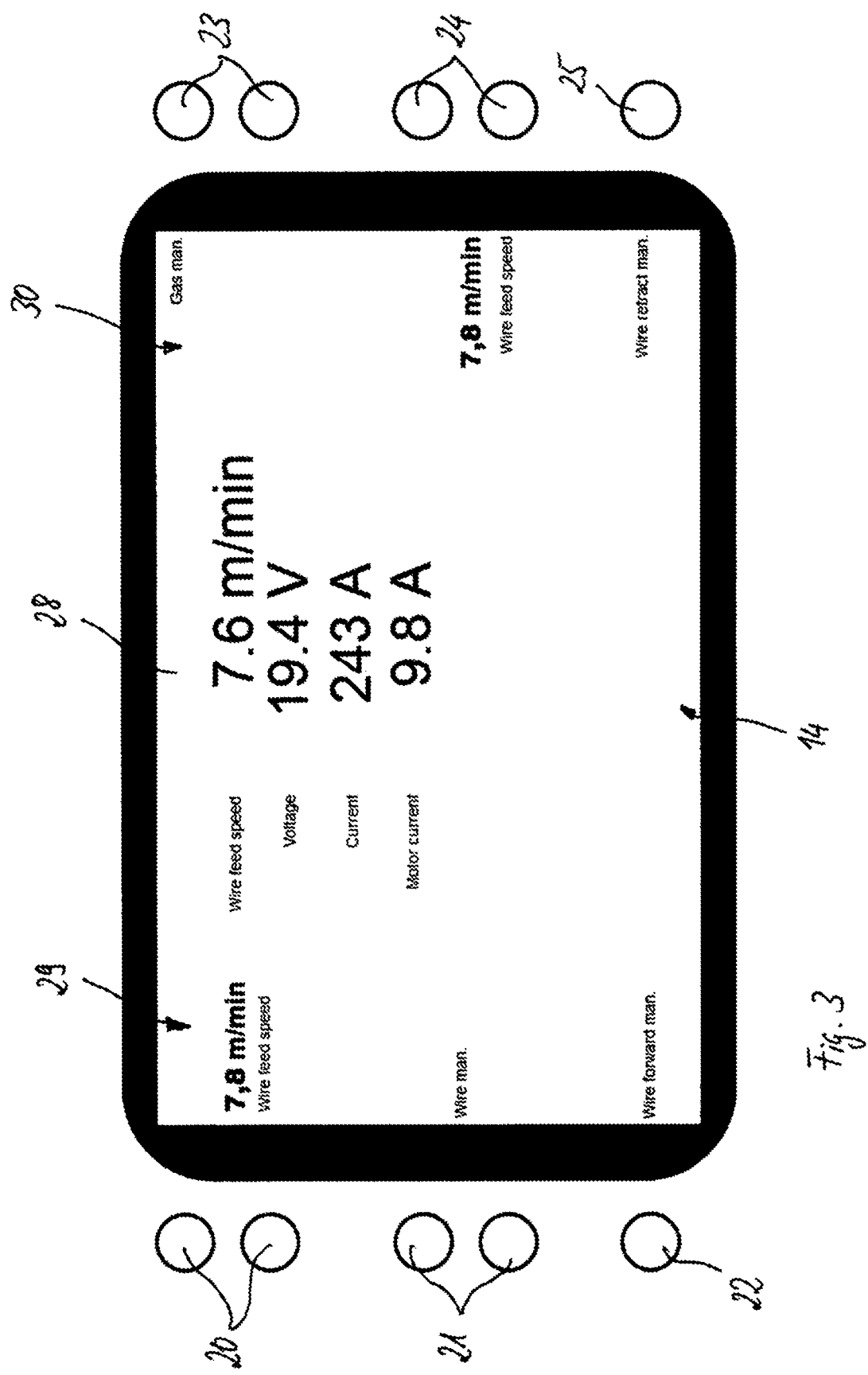
FIG. 3 shows an operating device from FIG. 2 having a touchscreen which is in a working mode.

To operate the welding current source and possibly other components provided in the welding circuit, the control panel can be set to two different modes, namely a working mode and an assignment mode. In its basic setting, the control panel is in the working mode in which, when one of the buttons 20-25 is actuated, a value of a parameter which is assigned to the respective hardware button 20-25 is adjusted. A specific configuration of the touchscreen and the hardware buttons, as well as an example of a display (GUI) provided on the touchscreen 14, is shown in FIG. 3. Accordingly, the GUI of the touchscreen 14 has a central area 28 in which current actual values of parameters are displayed in the working mode. In the exemplary embodiment, for example, the actual values for the parameters wire feed speed, the voltage, the current and the motor current are displayed. In the working mode, setpoints of the parameters that are assigned to the individual hardware buttons are also displayed in two edge areas 29, 30 of the touchscreen 14 via the hardware buttons 20-25. For each hardware button, the parameter value is displayed at a location on the respective edge area 29, 30 of the touchscreen that is immediately adjacent to the corresponding button. For the hardware buttons 22, 25, the function which can be switched on or off via the respective button 20, 25, here for example the manual wire feed and the manual wire retraction, is displayed in the edge area 29, 30.

By touching the edge area 29, 30 of the touchscreen, it is possible to switch from the working mode to the assignment mode. In the preferred exemplary embodiment shown here, the assignment mode is activated only for the hardware button that is located next to the touch point on the touchscreen 14. In this context, rocker buttons (20, 21, 23, 24) and double buttons, for example for +/−settings, are each regarded as just one button. Each of the hardware buttons 20-25 therefore has an area adjacent to it on the touchscreen 14, the actuation of which causes a switchover for only this hardware button from the working mode to the assignment mode.

Figure 4:
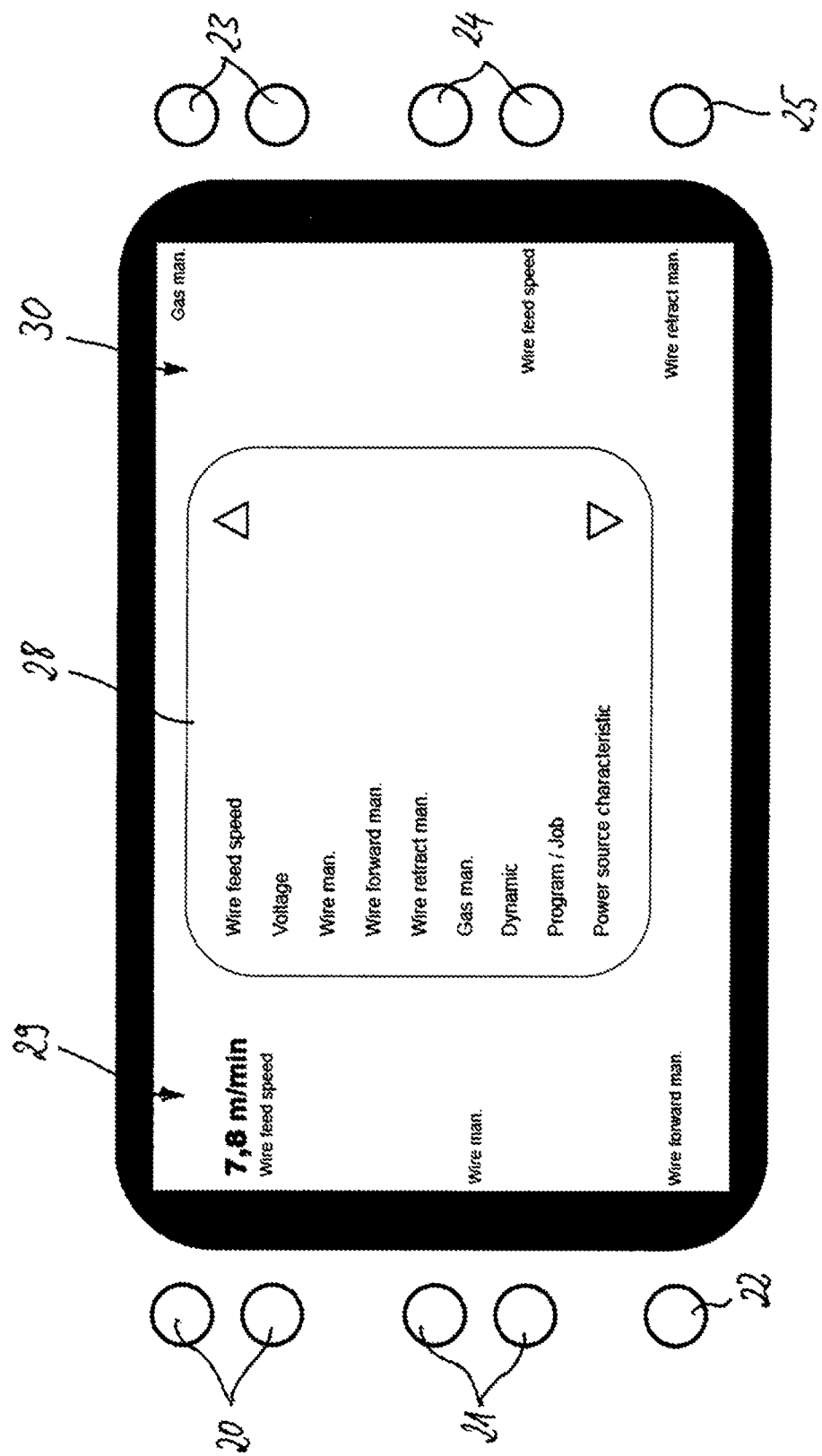
FIG. 4 shows the operating device of FIG. 3, the touchscreen of which is in the assignment mode.
Figure 5:
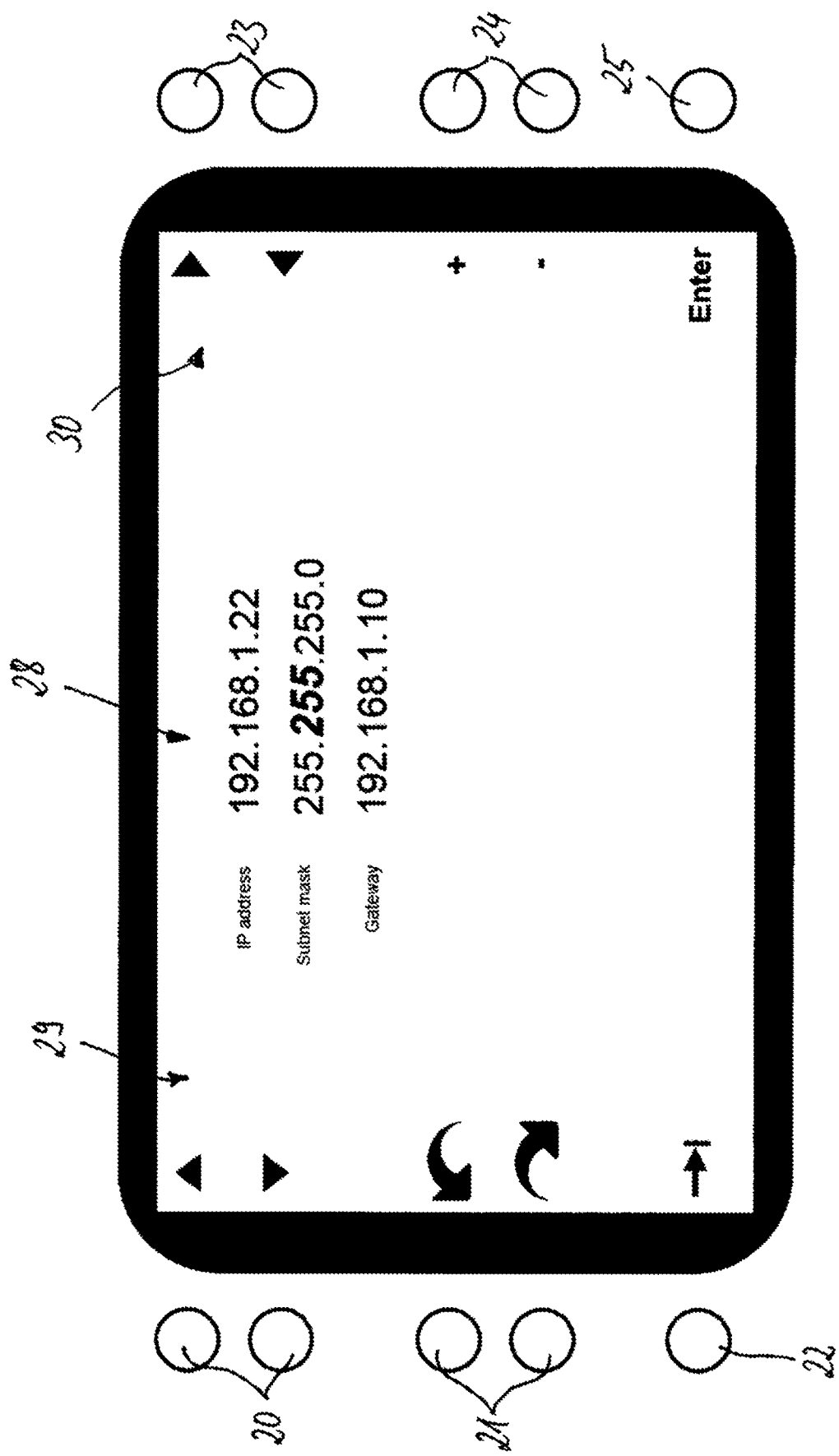
FIG. 5 shows the operating device of FIG. 3, the touchscreen of which is in the working mode on a further operating level.

Such an assignment mode for one of the hardware button pairs 20, 21; 23, 24 is shown in FIG. 4. As shown here, the display in the central area 28 of the touchscreen 14 has changed due to the activation of the assignment mode. Now a list with possible parameters which are available for an assignment to the respective hardware button is displayed in the central area. Since the list is longer than the display area, it is possible to navigate in the list using touch-sensitive arrow buttons as part of the touchscreen. A touch of one of the displayed parameters can then select a parameter and assign it to the respective hardware button for which the assignment mode is currently activated. By this selecting and assigning, the assignment mode is automatically ended and the working mode is reactivated. The control panel can thus be used to control a welding process again. At any time, either for the same hardware button as just above, or for any other of the hardware buttons 20, 21, 22, 23, 24, 25, it is possible to switch from the working mode to the assignment mode and to assign the respective hardware button a different parameter rather than the currently available parameter assignment, and/or to assign another function to the respective hardware button. The hardware buttons 20-25 are thus designed as soft keys, the purpose and/or function of which are not fixed but can be changed. Another level of the GUI of the control panel 2 is shown in the illustration in FIG. 5. In this level, information about the network to which the welding current source and its controller are connected is shown on the central area 28 of the touchscreen 14. The hardware buttons 20-25 are assigned navigation functions, such as "up/down," "left/right," "undo/redo," "tab" and "enter," "plus/minus." Using the navigation functions, a specific input mask or selection menu can be activated, for example using a tab function that is currently assigned to the button 22. The same is possible with the help of an "arrow up" or "arrow down" button. With the "+"/"−" button, the value of the previously activated parameter can be increased or decreased, and saved with the "enter" button 25. The hardware buttons are also designed as soft keys in this level. A change in the function of one of the buttons 20-25 can again be made by touching the touchscreen 14 in a region of the edge regions 29, 30 immediately adjacent to the respective button. As a result, instead of the previous working mode, the assignment mode is activated and a selection menu of symbols of navigation functions is activated in the central region 28 of the GUI of the touchscreen 14. By selecting one of the navigation functions displayed, it is assigned to the respective hardware button, the assignment mode is ended, and the working mode is activated.

Figure 6:
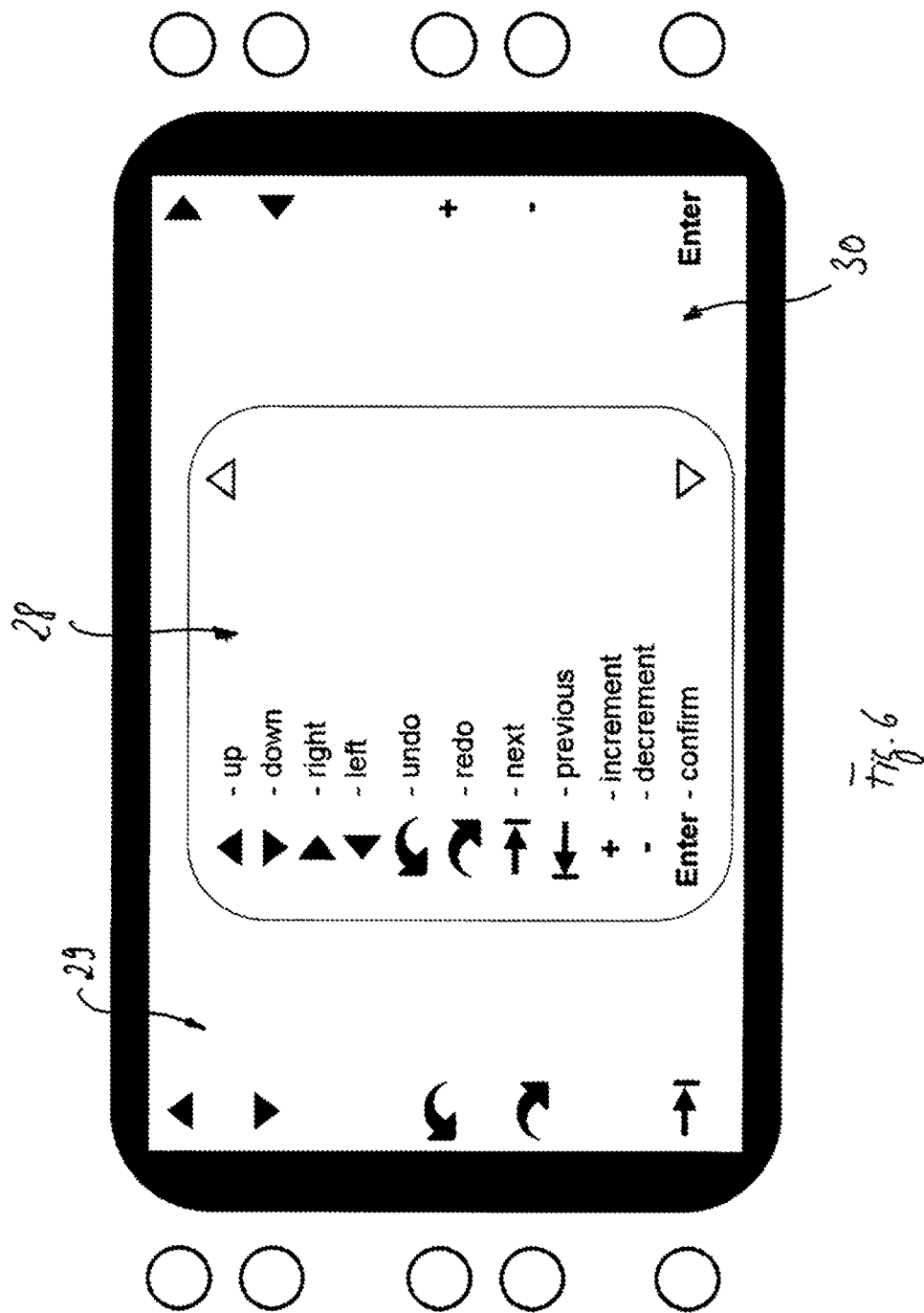
FIG. 6 shows the operating device of FIG. 5, the touchscreen of which is in the assignment mode on a further operating level.

In a further variant, which is not shown, it can be provided that the selection for the assignment of the parameters from FIG. 4 is made by navigation buttons, as shown in FIG. 6. For this purpose, navigation buttons can be assigned to the hardware buttons in the assignment mode for selecting and assigning parameters for individual hardware buttons, and can be assigned to the hardware buttons for the duration of the assignment mode.

| List of reference numbers | |
|---|---|
| 1 | welding current source |
| 2 | control panel |
| 3 | welding current cable |
| 4 | housing |
| 4a | upper housing section |
| 4b | lower housing section |
| 5 | pole contact device |
| 6 | pole contact device |
| 7 | underside |
| 8 | cable |
| 9 | stand element |
| 10 | housing |
| 14 | touchscreen |
| 15 | handle strip |
| 16 | handle strip |
| 17 | side edge |
| 18 | side edge |
| 20 | hardware button |
| 21 | hardware button |
| 22 | hardware button |
| 23 | hardware button |
| 24 | hardware button |
| 25 | hardware button |
| 28 | central area |
| 29 | edge area |
| 30 | edge area |

The invention claimed is:

1. An operating device of a welding system, having a display means for the visual representation of set parameter values of the welding system, and having input means by means of which parameters of the welding system can be changed,
    characterized in that
    a plurality of input means of the operating device arranged outside the display means is provided, and these are designed as soft keys, wherein, in an assignment mode of the operating device, each of the soft keys can be successively assigned different parameters of the welding system or functions, via operation of the operating device, due to the fact that the display means designed as a touch-sensitive touchscreen can be actuated, and the respective soft key can be assigned a specific parameter or a specific function by selection from a predefined selection of parameters or functions displayed on the display means and, after selection, in a working mode of the operating device, the respective parameter can be changed or the function can be applied by actuating the respective soft key,
    characterized by one or more edge areas of the touchscreen which, when actuated, leads to the activation of the assignment mode for one or more corresponding hardware buttons, wherein all the edge areas are adjacent to all their corresponding hardware buttons.

2. The operating device according to claim 1, characterized by a plurality of areas of the touchscreen, wherein when one of these areas is activated, the assignment mode is activated for a specific hardware button, in particular only one, or only one rocker button, or only one double button, of the hardware buttons.

3. The operating device according to claim 1, characterized by at least one double button or rocker button which, when its two buttons are assigned two functions which belong together but are different, upon activation of an area of the touchscreen assigned to them, a separate assignment mode is entered for each of the two buttons of the respective double button or the rocker button.

4. The operating device according to claim 3, characterized in that, in the case of a double button or a rocker button, in which a separate assignment mode is activated for each of the two buttons of the double button or rocker button, when a function is assigned to one of the two buttons of the double button or rocker button, by means of this assignment both buttons of the double button or rocker button switch into an execution mode.

5. The operating device according to claim 1, characterized by a configuration of the touchscreen by means of which an automatic change from the assignment mode to the working mode takes place when a parameter or a function is assigned to one of the hardware buttons.

6. The operating device according to claim 1, characterized by a configuration by which the assignment mode can be activated and preferably also deactivated for at least several of the hardware buttons, separately from other hardware buttons.

7. The operating device according to claim 1, characterized by at least one pair of hardware buttons by means of which when one hardware button of the pair of hardware buttons is activated, a parameter value changes in one direction, and when the other hardware button of the hardware button pair is actuated, the same parameter value changes in the other direction, wherein different parameters can be successively assigned to the same pair of hardware buttons.

8. A method for controlling a welding system by means of an operating device, which is or can be connected to the welding system for supplying control signals, the operating device being provided for this purpose with a display means for the visual representation of set parameter values of a welding system, and having input means which are actuated to change parameters of a welding system, characterized in that a plurality of input means of the operating device which are designed as soft keys are arranged outside the display means, wherein, in an assignment mode of the operating device, different parameters of the welding system are successively assigned to each of the soft keys by the display means, which is designed as a touch-sensitive touchscreen, being actuated and the respective soft key being assigned a specific parameter by selection from a predefined selection of parameters displayed on the display means and, after selection or at the same time as the selection, in a working mode of the operating device, the respective parameter is changed by actuating the respective soft key, wherein one or more edge areas of the touchscreen which, when actuated, leads to the activation of the assignment mode for one or more corresponding hardware buttons, wherein all the edge areas are adjacent to all their corresponding hardware buttons.

* * * * *